United States Patent

[11] 3,622,016

| [72] | Inventor | Jerry W. Welker<br>Selma, Calif. |
|---|---|---|
| [21] | Appl. No. | 828,888 |
| [22] | Filed | May 29, 1969 |
| [45] | Patented | Nov. 23, 1971 |
| [73] | Assignee | Sperry Rand Corporation<br>New Holland, Pa. |

[54] CAM FOR A BALE WAGON ROLLING RACK
14 Claims, 6 Drawing Figs.

[52] U.S. Cl................................................. 214/6 B,
214/82
[51] Int. Cl........................................B65g 57/28,
B65g 59/00
[50] Field of Search..........................................214/6 B, 82,
518, 519, 520, 522

[56] References Cited
UNITED STATES PATENTS

| 3,373,882 | 3/1968 | Forest | 214/6 B |
|---|---|---|---|
| 3,401,810 | 9/1968 | Grey | 214/6 B |
| 3,429,465 | 2/1969 | Gardner | 214/83.24 |
| 3,446,370 | 5/1969 | Clendenin et al. | 214/6 B |
| 3,478,898 | 11/1969 | Graham et al. | 214/6 B |
| 3,487,955 | 1/1970 | Brown | 214/6 B |
| 3,515,291 | 6/1970 | Grey et al. | 214/6 B |
| 3,521,762 | 7/1970 | Walters | 214/6 B |
| 3,502,230 | 3/1970 | Grey et al. | 214/6 B |

*Primary Examiner*—Albert J. Makay
*Assistant Examiner*—Robert J. Spar
*Attorneys*—Joseph A. Brown, John C. Thompson, James J. Kennedy and George C. Bower ABSTRACT: A bale wagon having a bale-supporting bed which is adapted to receive, accumulate and discharge successive bale tiers at one end of the bed, a movable rolling rack which supports successive bale tiers during loading, transport and discharge of the wagon and which will tilt at the one end of the bed during discharge to force the last tiers of bales from the bed. The bale wagon also has fixed support members disposed at the rear of the bed which are laminated for strength and which will support and stabilize the rolling rack when it is moved to its most rearward position on the bed.

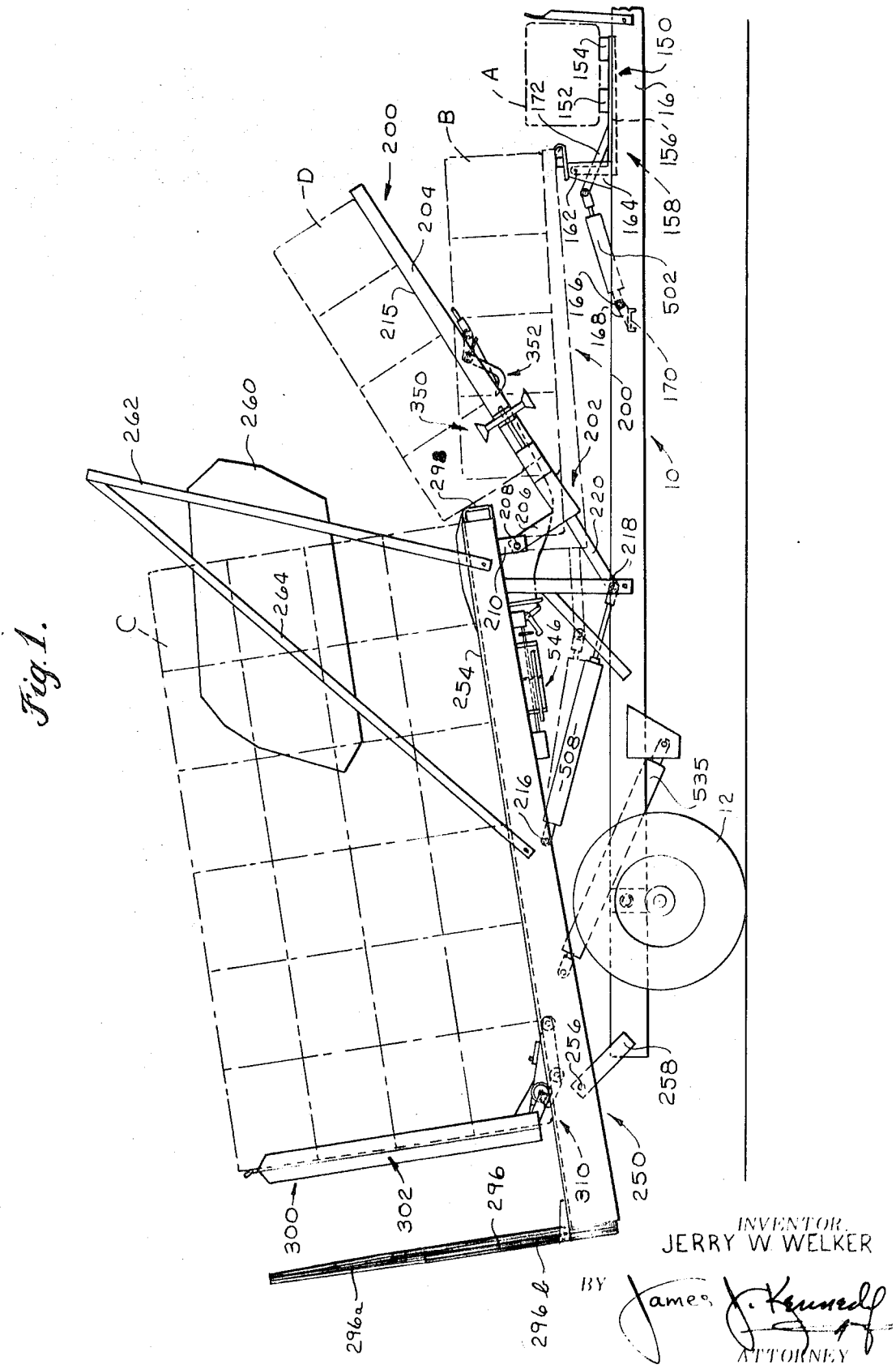

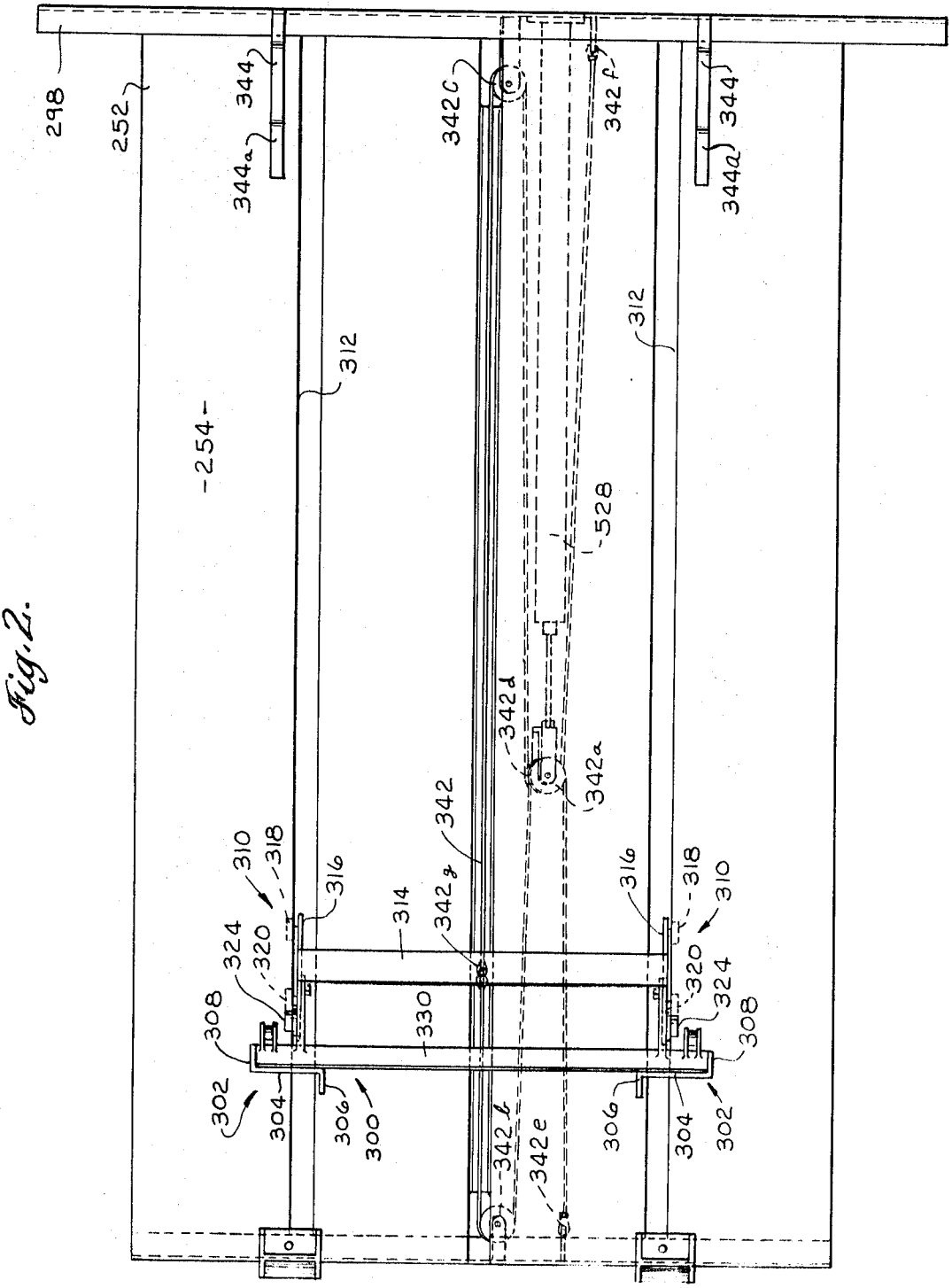

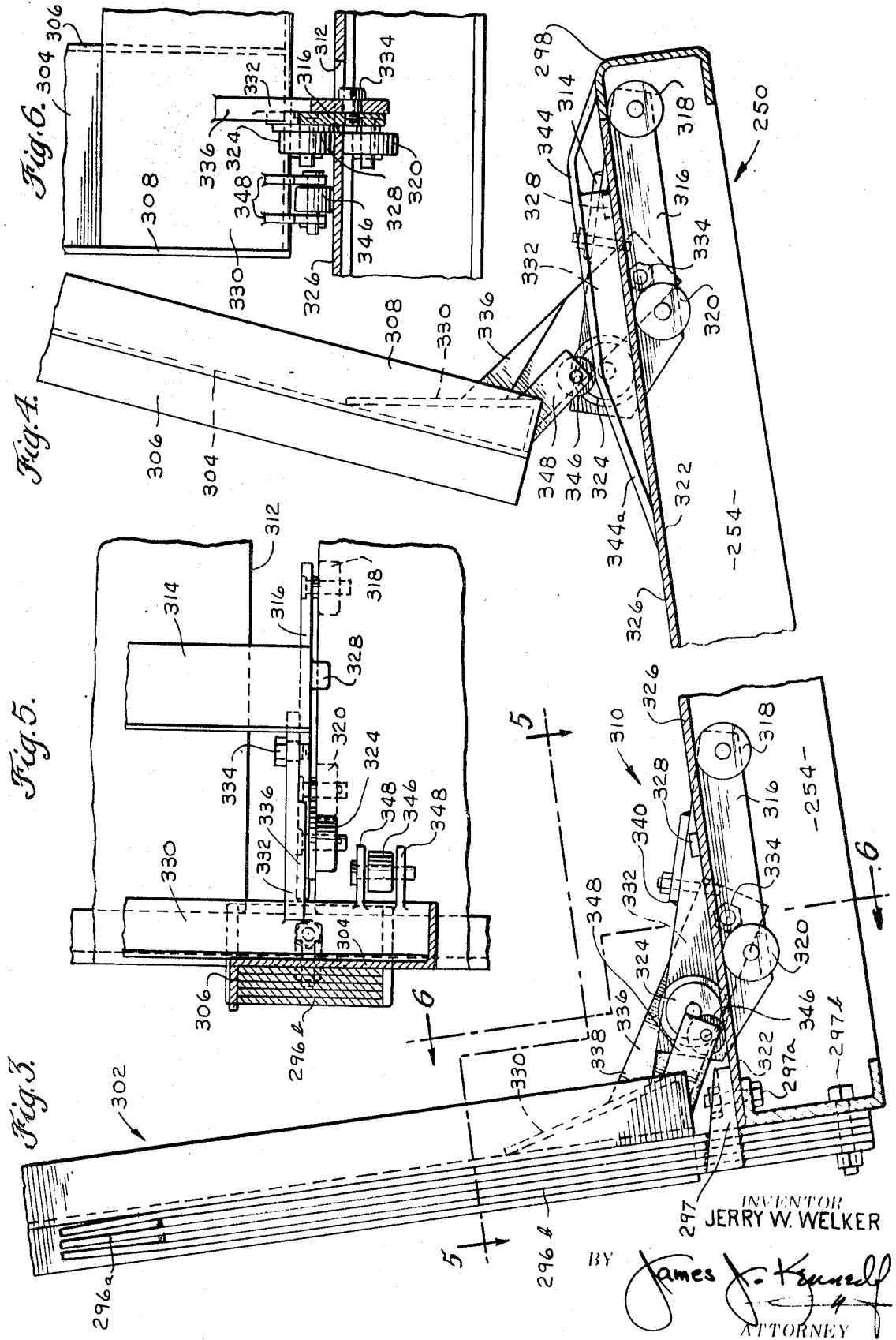

CAM FOR A BALE WAGON ROLLING RACK

BACKGROUND OF THE INVENTION

This invention relates generally to bale handling wagons and specifically to single bale unloading wagons having movable rolling racks on the load bed.

Earlier bale wagon designs, such as the wagon shown and described in U.S. Pat. No. 2,848,127, issued to Grey on Aug. 19, 1958, were able only to pickup, stack and discharge a complete bale stack. Later, the wagons were further refined so that they could also retrieve a complete bale stack in addition to the other operations. These wagons were not designed to be unloaded one bale at a time. The earlier Grey wagon was provided with a movable rack structure on its load-carrying bed which was spring loaded. It would index rearwardly, against the bias of the spring on the bed a distance equal to one bale width as each successive bale tier was delivered to the load bed during the loading operation. Upon discharge of the stack from the wagon, the load applied to the biased rack was removed and the rack moved toward the receiving end of the load bed by the spring. The movable rack, or support, extended upwardly away from the load bed surface, generally perpendicular thereto, during the entire loading operation.

With the further evolution of the Grey-type wagon for stacking and retrieving hay bales, to a wagon which would not only stack and retrieve, but would also unload the bales from the wagon one bale at a time. Many structural and functional changes had to be made to the wagon design. This wagon has been shown and described in an earlier filed application Ser. No. 755,141, filed Aug. 26, 1968 now U.S. Pat. No. 3,502,230. One of the necessary changes to permit single bale unloading was a power-operated rolling rack, or bale support. In addition to making the rolling rack positively movable in a fore-and-aft direction along the load bed, it was also found necessary to make the rack pivotal with respect to the bed so that the last tier of bales could be discharged from the wagon.

The upright forks which actually engage and support the forming bale stack are mounted on trolley members which ride along the load bed in specially provided grooves. These trolleys had to extend far enough ahead of the forks to provide adequate support for them. Because of this, the upright supports could not move close enough to the leading edge of the load bed to discharge the last tier of bales. The center of gravity of the last bale tier was too far back to ensure that the bales would topple off the bed onto the inclined transfer table to be unloaded from the wagon.

It was also found necessary to provide fixed forks at the rear of the wagon which would engage and further stabilize the rolling rack forks when the wagon was fully loaded, or when it was desired to discharge a completed stack of bales, or when retrieving a stack of bales. These fixed forks had to be arranged on the bed so that they would engage a flange and web portion of the movable forks.

SUMMARY OF THE INVENTION

Accordingly then, the principal object of the present invention is directed to means for discharging the last bale tier from a bale wagon load bed using the rolling rack and a cam member provided on the load bed.

Another object of the invention is to provide means on the rolling rack which are engageable both with the upper surface of the load bed and with the cam members fixed to the load bed at the front edge thereof.

Another object of the invention is to have the rolling rack pivotally connected to trolley members which ride in spaced grooves in the load bed so that the rack is pivotally movable with respect to the load bed.

A further object of the invention is to have the means on the rolling rack engageable with the cam members which will cause the movable forks to be inclined with respect to the load bed to discharge the last bale tier from the bed.

A still further object of the invention is to have a cam member having a profile which will permit uninterrupted movement of the bales as they pass thereover.

An additional object of the invention is to provide movable forks on the rolling rack which are of Z-shaped configuration so that the web and a forwardly extending flange will engage the bales and the rearwardly extending flange will engage fixed forks mounted at the rear of the load bed.

A still further object of the invention is to provide fixed forks at the rear of the load bed which are strong, cheaply manufactured and which will provide additional support for the rolling rack during stack discharge and retrieval.

Another object of the invention is to provide forks which are comprised of laminated panels which are welded together.

Other objects of the invention will be apparent hereinafter from the specification and from the recital in the appended claims.

BRIEF DESCRIPTION OF THE DRAWINGS

FIG. 1 is a side elevational view showing the bale wagon in its single bale unloading operational mode with the transfer table shown inclined in full lines and in the normal bale receiving operative mode with the transfer table shown in the dot-dash lines;

FIG. 2 is an enlarged plan view of the load bed and rolling rack of the invention;

FIG. 3 is an enlarged fragmentary, sectional, elevational view of the rolling rack in the rearmost position with the fork of the rolling rack in engagement with the fixed fork;

FIG. 4 is an enlarged fragmentary sectional elevational view with the rolling rack in the forwardmost position and tipped by the cam member;

FIG. 5 is a plan section taken as indicated by the arrows of line 5—5 in FIG. 3; and FIG. 6 is a cross section taken as indicated by the arrows of line 6—6 in FIG. 3.

DESCRIPTION OF THE PREFERRED EMBODIMENT

FIG. 1 of the drawing illustrates, in a general manner, the configuration of a single bale unloading wagon which is to be presently considered. Referring specifically to FIG. 1, the bale wagon of this invention is provided with a chassis structure indicated by the numeral 10, and the chassis structure is mounted on a pair of left and right hand wheels 12, only one of which is shown. The chassis structure 10 is formed of a pair of longitudinally extending rails, or beams, 16, only one being shown. The specific details of the chassis structure and how the chassis is adapted to be mounted to a pulling tractor or other powered vehicle is clearly and specifically shown in the earlier-mentioned application Ser. No. 755,141. Since the details of the chassis structure and of the receiving table and the transfer tables do not form a specific part of this invention, they will only be referred to generally and a complete description of these elements may be found in the aforementioned copending application.

Adjacent the forward end of the chassis structure 10, there is mounted a first receiving table generally indicated by the numeral 150. The receiving table is comprised of two transversely extending beams 152 and 154 which are mounted on a forwardly extending horizontal portion 156 of an L-shaped structure generally indicated by the numeral 158. The L-shape structure 158 is pivotally secured by one end at 162 to spaced apart brackets 164. The brackets 164, are mounted on the longitudinally extending chassis rails 16, and, in this instance, only one of them is shown. A hydraulic cylinder 502 is pivotally secured by means of a pivot pin 166 to a forwardly extending leg 168 which is mounted on a transverse frame member 170. Rod end 504 of the cylinder 502 is pivotally secured to an arm 172 which is welded, or otherwise secured, to the L-shaped member 158 the receiving table 150. As is evident from the illustration in FIG. 1, cylinder 502 is extendable and the receiving table 150 will swing upwardly about its pivot point 162 transferring any bales which have been accumulated on the table (for example, bale A) onto the second, or the transfer table, 200. When the table 200 is shown in the position illustrated by the dot-dash lines of FIG. 1, the transferred bale A will assume a position shown at B at the forward edge of the transfer table 200.

It will be understood by those skilled in the art that the bales are first introduced to the receiving table 150 by means of a pickup, not shown, which lifts the bales from the ground and directs them to the receiving table. Such a pickup means, well known in the art, is more fully described and disclosed in the U.S. Pat. to Grey et al. No. 3,300,424, issued July 11, 1967. The pickup means forms no part of the present invention and, therefore, has not been shown, or described in any detail.

The transfer table 200 is likewise mounted on a pair of L-shaped structures generally indicated by the numeral 202. As before, only one of the L-shaped structures is shown for the purposes of illustrating the present invention. Each structure 202 is provided with a forwardly extending leg portion 204 and an upwardly extending leg portion 206, which is disposed at right angles to the forwardly extending leg 204. Each of the upwardly extending leg portions 206 are secured by a pivot pin 208 to a depending lug 210 which is mounted on a forward end portion 252 of load bed 250. A bed surface of the transfer table 200 is formed across the legs 204 and provides the surface upon which bale tiers are successively received and accumulated. When the transfer table 200 is in its normal tier forming position, that position being shown in the dot-dash lines of FIG. 1, the table will accumulate a plurality of bales to form a tier of bales thereon. When the requisite number of bales B have been accumulated on table 200 and a bale tier is formed, a hydraulic cylinder 508 is actuated so that it extends and causes the table 200 to swing upwardly about its pivot point 208. In this manner, the bale tier formed on the transfer table is placed on a rearwardly disposed load rack, or load carrying bed shown generally by the numeral 250. An anchor end 510 of cylinder 508 is secured by means of a pivot pin 216 to the load bed 250. The cylinder rod end 512 is pivotally connected by means of a pivot pin 218 to a rearwardly extending member 220, which is fixed by its forward end to the rear portion of L-shaped structure 202.

The load bed 250 includes a platform assembly 254 which forms an upper support surface for bales being placed thereon, and the bed itself is mounted for swinging movement about a pair of transversely rearwardly disposed pivot pins 256. The pivot pins are supported on upwardly and rearwardly extending brackets 258 which are secured at the rear end of the longitudinally extending frame members 16. As before, only one of these members is shown since they form no particular part of the present invention. As the stack of bales is formed on the load bed 250 by a receipt thereon of successive bale tiers from the transfer bed 200, the second table 200 is swung upwardly to deposit its bale tiers upon the load bed, whereupon the bales B assume the position shown at C in FIG. 1. As the bales are deposited, a rolling rack 300 is contacted by the bales and forced rearwardly as successive tiers of bales are placed on the load bed. The bale tiers are laterally confined by right and left-hand side shields 260, only one being shown, each of the shields being supported on upwardly extending front and rear struts 262 and 264, respectively.

A pair of forks 296 are fixed to the rear end of the platform assembly 254. A bracket 297 is bolted by means of the bolt shown at 298, in FIG. 3, to the rear end of the load bed and extends outwardly therefrom where it is fixed to the fork members 296 by welding, or the like. As can be seen in FIG. 3, the fork members 296 are also bolted by their lowermost portion to the rear end of the platform assembly 254 by means of bolts 297b. Each of the forks 296 is comprised of an upper portion 296a and a lower portion 296b. The entire fork is comprised of a plurality of plates which are welded together to form the laminated structure shown in FIGS. 1, 3 and 5. The bottom portion 296b is comprised of five of these plates which are welded together to provide maximum strength while the upper portion 296a is comprised of three of these plates which, again, are welded together to form a laminated structure. In this way, a strong, composite fork may be manufactured easily and cheaply using only pieces of scrap metal. This poses distinct advantages over a construction which would call for a tapered beam of the thickness shown by the upper and lower portions 296a and 296b, respectively, from both a manufacturing and costing standpoint.

The rolling rack 300 is mounted on the platform assembly 254 and is adapted to support a stack of bales in a manner best shown in FIG. 1. The rolling rack is comprised of two spaced-apart forks 302, which are illustrated in FIGS. 1 and 2, and which are mounted for movement in a fore-and-aft direction along platform 254. Each movable fork 302 is comprised of a Z-shaped section having a web portion 304, a rearwardly extending inner aligning flange portion 306 and an outwardly extending flange portion 308 which is adapted to dig into the bales loaded against the rolling rack and provide lateral stability therefor. A pair of trolley assemblies 310 are adapted to carry the forks 302 for movement along the platform 254. Each trolley assembly 310 is adapted to run in a groove 312 formed in the platform assembly, as shown in FIG. 2. A member 314, which extends transversely to the grooves 312, connects each of the trolley assemblies, as shown in the drawings. Each assembly 310 includes a longitudinally extending member 316 which is welded, or otherwise, fixed to an end of transverse member 314. Front and rear lower rollers 318 and 320, respectively, are mounted on member 316 in a conventional fashion, the rollers being adapted to contact a lower surface 322 of platform assembly 254 adjacent the fore-and-aft extending grooves 312. An upper roller 324, also mounted on member 316, is adapted to contact an upper surface 326 of platform assembly 254. It will be readily apparent then, to those skilled in the art, that the member 316 will move in a fore-and-aft direction with respect to the load bed, since vertical movement is limited by the rollers 318, 320 and 324. Transverse movement of member 316 is limited by the member 314, a pad 328 and the outer edge of groove 312.

A triangular, transversely extending member 330 extends between the movable forks 302 and is welded thereto so as to make the rolling rack an integral assembly. A pair of forwardly extending mounting brackets 332 are welded at their rear ends to the triangular frame member 330, as shown in FIGS. 3 and 5, and by their forward ends they are pivotally secured to the member 316 by means of a pivot bolt 334. The outer edge of each mounting bracket 332 is provided with a stop 336 which contacts the upper rear surface of member 316, the stop 336 being welded to the outside of the bracket 332. Forward pivotal movement is limited by the contact of the upper surface 338 of the bracket 332 with the rear edge 340 of transverse member 314. Contact between surface 338 and rear edge 340 will occur normally only when the wagon is in its single bale unloading operational mode and the rack is in the process of discharging the last tier of bales from the load bed.

Means are provided on the load bed for moving the rolling rack in a fore-and-aft direction along the bed. These means comprise a cable 342 which is connected to the rolling rack between the bed means 250 and a double acting hydraulic cylinder 528. As can be seen in FIG. 2, the cable 342 extends around sheaves 342a, 342b, 342c and 342d, while the cable is anchored to the load bed 342e and 342f and to the rolling rack at 342g. As hydraulic fluid moves from one side of the double acting cylinder to the other, the rolling rack is caused to travel in a fore-and-aft direction along the load bed 250. When the rolling rack has been positioned in its rearmost location, it can be seen, referring to FIGS. 3 and 5, that the movable forks 302 and the fixed forks 296 are in substantial alignment and the fixed forks 296 will engage web portion 304 and the rearwardly extending flange portion 306 of the movable forks. In this manner, when the load bed is fully loaded with a completed stack of bales, and the bales are being transported to a position for unloading as a composite stack, or the wagon is about to retrieve a composite stack, the fixed forks 296 and their engagement with the movable forks 302 increase the stability of the rolling rack and afford protection to the rolling rack during a stack discharge or stack retrieving operation.

At the very forward end of the wagon there are provided a pair of cam members 344 which are fixed to the upper surface 326 of support bed 254 to the outside of grooves 312. The cam members are spaced from the groove 312 a distance sufficient to permit the trolley members of the movable rolling rack to pass in the grooves toward the front end of the load bed without interference or interruption. The rear edge 344a of the cam member 344 is inclined relative to the load bed 254, and extends upwardly therefrom to a generally horizontal portion which extends forwardly toward the front end of the load bed in a spaced-apart relation from upper surface 326 of the support assembly. The forward end of the cam member is inclined downwardly to provide a surface which will permit bales being transferred from the transfer bed to the load bed during loading without interruption. The cam also helps the bales bridge the gap formed by groove 312 in the load bed. A roller 346 is rotatably mounted with respect to the rolling rack on either side thereof between lug pairs 348 which are welded to the member 330, as shown in FIGS. 3–6. The rollers 346 normally contact the upper surface 326 of support assembly 254 in rolling contact and keep the movable forks 302 in an upright, generally perpendicular position, relative to the load bed 250. As the cylinder 528 is actuated by lever means 546, shown in FIG. 1, the movable forks 302 will remain in their perpendicular position relative to the bed until roller 346 contact the lowermost portion of the inclined 344a of cam 344. Continued forward motion of the rolling rack causes the roller to advance up the incline 344 while at the same time imparting a tipping motion through pivot bolt 344 to the rolling rack. As shown in FIG. 4, the rolling rack 344 is then inclined relative to the load-carrying bed 250. If the load bed is carrying bale tiers thereon and these tiers are discharged one bale at a time while the wagon is in its single bale unloading mode, the cylinder 528 would have been actuated to move the rolling rack forward to discharge one tier at a time from the front edge 298 of load bed 250. In order to discharge the last tier of bales from the bed, the tier of bales actually in engagement with the rolling rack, it is necessary to impart a tipping motion to the rolling rack to shift the center of gravity of this last bale tier so that it too can be discharged. As can be seen from the drawings, if the movable forks 302 remained in a generally upright position, perpendicular to the surface of the load bed, then the bales in the last tier could not be discharged from the bed because the rolling rack could not move forward far enough to discharge them. The trolley assembly 310 which supports the movable forks during movement, prevent further forward movement of the rolling rack due to their contact with beam 298 of the load bed.

The single bale unloading operation can best be described briefly as follows. The wagon has been completely loaded and the rolling rack is in its rearwardmost position, the position shown by FIGS. 3 and 5 of the drawings, and it is now desired to unload the wagon one bale at a time. First, the transfer 200 is inclined in a position shown by solid lines in FIG. 1 relative to load bed 250. The actuating lever 546, which will control the operation of cylinder 528 will also control operation of a cross conveyor 350, located on the transfer table 200, and bale engaging means 352, also located on transfer table 200. The actuating lever is operated so that the first tier of bales C on the load bed 250 are caused to be moved forward by an advancement of the rolling rack by one bale width so that the bales topple over onto the transfer table 200 and assume the position D shown in FIG. 1. Then, by an automatically cycled operation, the bales D are removed from the wagon by cross conveyor 350 one bale at a time. A full and complete description of the single bale unloading operation may be found in the aforementioned application Ser. No. 755,141. This action is repeated until the rolling rack has advanced to a point where there is only one tier of bales left on the load bed. At that point, that tier of bales would be in approximately the same position shown by the first tier of bales illustrated by the dot-dash lines in FIG. 1. As can be seen, and as can be readily understood, additional forward motion must be imparted to the bale stack so that its center of gravity will be shifted enough so that it too may fall from the load bed onto the transfer table. It is at this point, that the rolling rack contacts the cam members 344 as it reaches its forwardmost position on the bale wagon, as shown in FIG. 4. As the rolling rack continues to advance up the cam member, the movable forks 302 are caused to pivot relative to the load bed and relative to the trolley assemblies so that the remaining bale tier is forced over the edge of box beam 298 and onto the transfer table for subsequent discharge from the wagon one bale at a time.

While this invention has been described in connection with a single embodiment thereof, it will be understood that this embodiment is capable of modification and that application is intended to cover any variations, uses, or adaptations following, in general, the principles of the invention and including such departures from the present disclosure as come within the known or customary practice in the art to which the invention pertains, and as fall within the scope of the invention or the limits of the appended claims.

Having thus described my invention, what I claim is:

1. A bale wagon having a chassis structure, bed means on said chassis structure, said bed means adapted for receiving, accumulating and discharging successive bale tiers at one end thereof, movable means on said bed means for supporting said successive bale tiers, means for moving said movable means toward and away from said one end of said bed means, and means at said one end of said bed means engageable with said movable means for tipping said movable means with respect to said bed means, said tipping means including a cam member and means on said movable means for engaging said cam member so as to tip said movable means relative to said bed means.

2. A bale wagon, as recited in claim 1, wherein said movable means extends upwardly from said bed means generally perpendicular thereto when said movable means is positioned rearwardly of said one end of said bed means and said movable means is inclined relative to said bed means when at said one end of said bed means.

3. A bale wagon, as recited in claim 1, wherein said means engageable with said cam member is a roller, said roller being engageable with said bed means when said movable means is positioned rearwardly of said one end of said bed means.

4. A bale wagon, as recited in claim 1, wherein said movable means comprises a pair of spaced-apart forks interconnected by a longitudinally extending member and a pair of trolley means engageable with said bed means and pivotally connected to said member whereby said forks may tip relative to said bed means and said trolley means.

5. A bale wagon, as recited in claim 1, wherein said bed means is provided with means at the other end thereof for engaging said movable means when said movable means is positioned at the other end of said bed means.

6. A bale wagon, as recited in claim 5, wherein said means at the other end of said bed means comprises a pair of upwardly extending forks fixed to said bed means and said movable means comprises a pair of upwardly extending Z-shaped forks having a webbed portion which is engageable with said bed mounted forks.

7. A bale wagon, as recited in claim 6, wherein said bed mounted forks are comprised of a plurality of laminated panels.

8. A bale wagon, as recited in claim 7, wherein said laminated forks are spaced apart on said bed means, and said Z-shaped forks are spaced apart and parallel to said laminated forks, said laminated forks engaging and stabilizing said Z-shaped forks when said Z-shaped forks are positioned at said other end of said bed means.

9. A bale wagon having a chassis structure, bed means on said chassis structure, said bed means adapted for receiving, accumulating and discharging successive bale tiers at one end thereof, the invention comprising movable means on said bed for supporting successive bale tiers, means for moving said movable means toward and away from said one end of said bed means, fixed support means on said bed means at the other end thereof for engaging and stabilizing said movable means when said movable means is disposed at the other end of said bed means, and means on said bed means at said one end thereof engageable with said movable means for tipping said movable means with respect to said bed means, said tipping means including a cam member and means on said movable means for engaging said cam member so as to tip said movable means relative to said bed means.

10. A bale wagon, as recited in claim 9, wherein said fixed means extends upwardly from said bed means generally transverse thereto and said movable means extends upwardly from said bed means and is inclined thereto when said movable means is disposed at said one end of said bed means and generally perpendicular to said bed means when said movable means is disposed rearwardly of said one end of said bed means.

11. A bale wagon, as recited in claim 9, wherein said fixed support means comprises a pair of spaced-apart forks and said movable means comprises a pair of spaced-apart forks and a transverse connecting member fixed to each of said forks, said movable forks having forwardly extending flanges, a rearwardly extending flange and an interconnecting web portion, said web portion and said fixed forks being engageable when said movable means is disposed at said other end of said bed means.

12. A bale wagon, as recited in claim 11, wherein said fixed forks are formed of laminated panels and said rearwardly extending flange portion engages an edge of said laminated forks when said movable means is in its rearward position for laterally stabilizing said movable means.

13. A bale wagon comprising in combination: a wheel supported chassis; a load bed mounted on said chassis and adapted to support a stack of bales; a transfer table mounted adjacent one end of said load bed and adapted to receive bales of hay, accumulate the bales into a tier and deposit the formed tiers onto said load bed in succession to form a stack, the stack including a plurality of tiers disposed in side-by-side relationship; a support movably mounted on said load bed and adapted to support the stack being formed by moving away from said one end of said load bed in increments as successive tiers formed by said transfer table are deposited on said load bed, said support being further adapted to move toward said one end of said load bed in increments such that individual tiers of the stack are pushed onto said transfer table; and means engageable with said support for tipping said support towards said one end of said load bed such that the last tier supported thereby is pushed onto said transfer table.

14. A bale wagon as recited in claim 13, wherein said tipping means includes a cam member and means on said support for engaging said cam member so as to tip said support relative to said load bed.

* * * * *